United States Patent [19]

Bareau

[11] 4,194,190
[45] Mar. 18, 1980

[54] ARRANGEMENT FOR CONVERTING DIGITAL SIGNALS REPRESENTING CHARACTERS INTO A SELF-LOCKING DOT REPRESENTATION

[75] Inventor: Alain Bareau, Les Ponts de Ce, France

[73] Assignee: Compagnie International pour l'Informatique Cii-Honeywell Bull (Societe Anonyme), Paris, France

[21] Appl. No.: 952,079

[22] Filed: Oct. 17, 1978

[30] Foreign Application Priority Data

Oct. 11, 1977 [FR] France .............................. 77 34053

[51] Int. Cl.$^2$ ............................................ G09B 21/00
[52] U.S. Cl. .................................. 340/407; 35/35 A
[58] Field of Search ..................... 340/407; 35/35 A

[56] References Cited

U.S. PATENT DOCUMENTS 3,987,438  10/1976  Lindenmueller ................. 340/407

*Primary Examiner*—Harold I. Pitts

*Attorney, Agent, or Firm*—Cameron, Kerkam, Sutton, Stowell & Stowell

[57] ABSTRACT

The present invention provides apparatus for converting digital electrical signals representative of alphanumeric characters and other symbols into a particular pattern of dots symbolic of the character or symbol as used, for example, in the Braille alphabet. The dot pattern is established by the tips of a plurality of stems which are raised and retracted in respect of a given surface by operation of electromagnetically response plunger cores slidably positioned in cavities which communicate with wells within which the stems slide. The ends of the cores within the cavities are bevelled. When a core is retracted from the cavity, the associated stem falls by gravity to its retracted position and is maintained in position with its end slightly spaced from the extreme bottom of the cavity by a stop member. This construction enables the bevelled ends of the cores to engage the ends of the stems and raise the stems when a write function is to be effected, after which the stems rest on the surface of the associated cores with their corresponding tips extending above the given surface.

12 Claims, 6 Drawing Figures

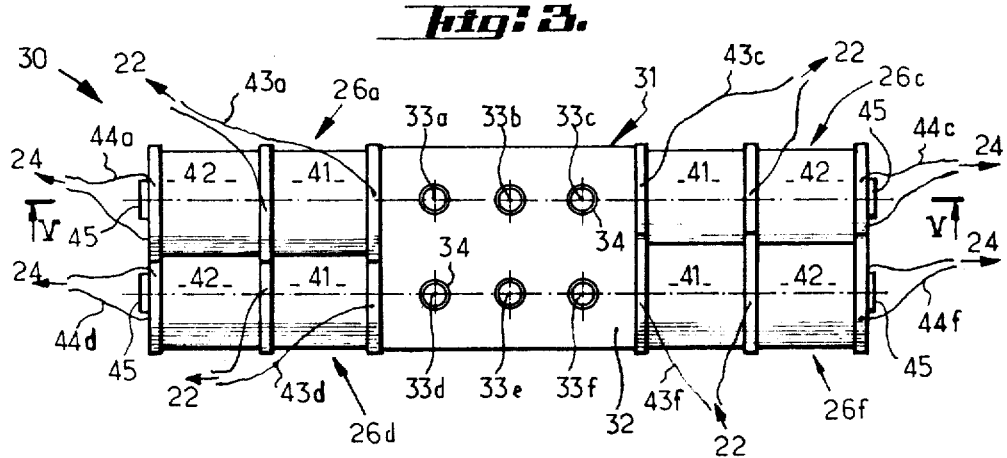
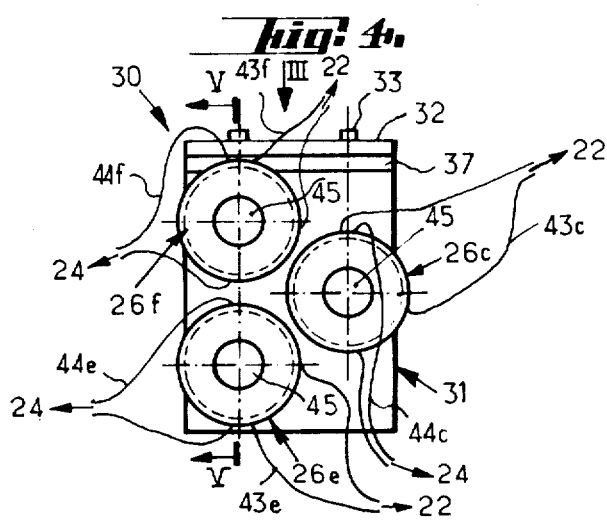
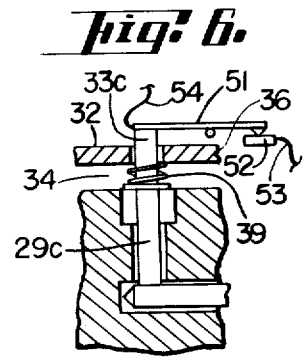
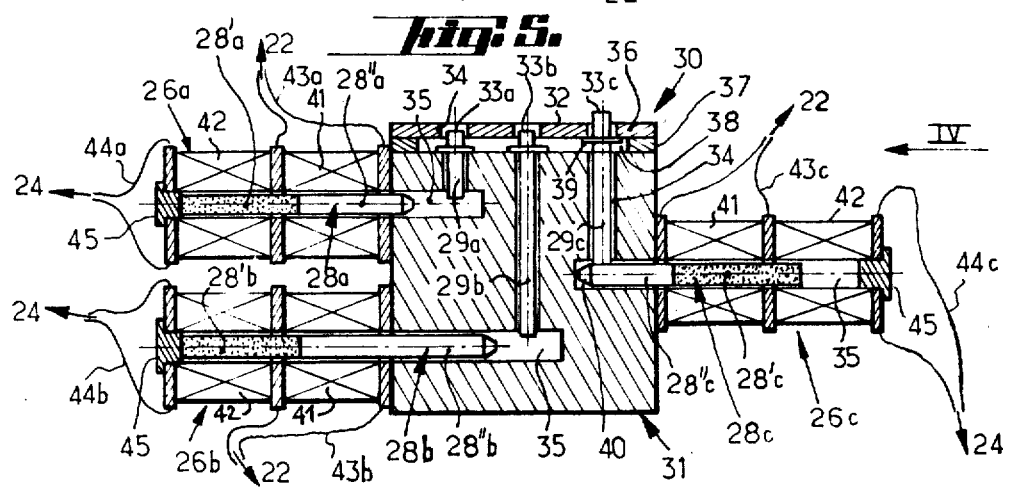

ARRANGEMENT FOR CONVERTING DIGITAL SIGNALS REPRESENTING CHARACTERS INTO A SELF-LOCKING DOT REPRESENTATION

BACKGROUND OF THE INVENTION

1. Field of the Invention

This invention relates to apparatus for converting digital electrical signals representing characters into particular self-locking patterns of dots. Each of these characters is symbolized by a dot pattern represented by projections which project from a given surface and which are related to a given number of dots lying in a predetermined grid and characteristic of a Braille code.

2. Description of the Prior Art

A typical representation of characters by means of a grid of dots is the code invented by Braille. The Braille code is a universal means of communication particularly well suited to use by the blind. All the characters and symbols in the Braille system correspond to respective particular patterns of projecting dots in a grid consisting of six dots.

It will apparent from the following description that the invention can be adapted to other applications, but the example which will be used to illustrate the invention will be based on the Braille alphabet.

Conventional arrangements for converting digital electrical signals representing characters to the Braille format are well known. In a typical data processing system, the digital signals from the processing source appear in a coded form, such as the octal coded form, and are processed by a transcoder which converts them to the Braille format as six-bit signals to allow the characters to be formed. Each of the six output channels from the transcoder is connected to an individual electromechanical member which causes a rod to project from the reading surface as a result of the said member being energized. The member may be energized when it receives a predetermined energizing level signal, for example, corresponding to the logic "1" level.

With this type of energization, the rods only project for the length of time during which the corresponding electromechanical members are energized. In the general case where the transcoded electrical signals are transient, but the reader requires the information to persist for a period of time which is relatively long compared with the transcoded signals, existing converting arrangements generally include a hold-in device connected between the transcoder and the electromechanical members to maintain the data in a read condition. In addition, a clearing member operated by the blind person serves to cancel out the information. Where it is necessary that the electromechanical members which are selected to present each character should remain energized for as long as the blind person requires, the addition of a hold-in member requires a consumption of energy which increases as the number of Braille producing modules on the blind person's reading panel increases.

SUMMARY OF THE INVENTION

The present invention solves the problem of maintaining the information readable without recourse to an electronic hold-in member and with no consumption of energy other than that required for the energization of the electromechanical members associated with the appearance of the signals, which come directly from the six output channels of the transcoder.

In broad terms, the present invention converts digital electrical signals representing characters into a particular pattern of dots. Each of the characters is symbolized by the dot pattern which is represented by projections which project from a given surface. The extending or selected projections correspond to a given number of dots in a predetermined grid. More specifically, there are provided at least one group of stems having first ends arranged to form the grid. Electromagnet means which react to the electrical signals operate to cause the stems to project, selectively, from the given surface. To this end, each of the stems is mounted to slide in a well which opens substantially orthagonally into a cavity in which a plunger core of an associated electromagnetic means is able to slide. A first end of the plunger core is capable of being subjected to a magnetic write flux which propels the plunger core in a given direction and to a magnetic clearing flux which moves it in the opposite direction. These two fluxes are generated respectively by at least one coil in response to the electrical signals and a clearing signal, respectively. A second end of the plunger core cooperates with the second end of the corresponding stem so as to raise the stem so that it projects in response to the magnetic write flux, and to keep it projecting until the clearing flux is generated.

The information is thus maintained by automatically locking the stems mechanically by means of their corresponding plunger cores, i.e., by allowing the stems to rest on the surface of the cores. In response to a clearing signal, a magnetic clearing flux having a mechanical effect which is the reverse of that of the write flux causes the plunger core to retract and disengage from the stem thereby allowing the first or reading ends of the stem to retract.

BRIEF DESCRIPTION OF THE DRAWINGS

The features and advantages of the invention will be more clearly apparent from the following description, which is given with reference to the accompanying drawing wherein:

FIGS. 3 and 4 are views from above and from one side, respectively, of an embodiment of a Braille reproducing module according to the invention;

FIG. 5 is a cross-sectional view, on line V—V of FIGS. 3 and 4, of the module shown in these two latter figures; and FIG. 6 is a fragmentary cross-sectional view of the stem 29C of FIG. 5 illustrating a resilient return arrangement and operating members responsive to the position of the stem.

DESCRIPTION OF THE PREFERRED EMBODIMENTS

Figure 1:
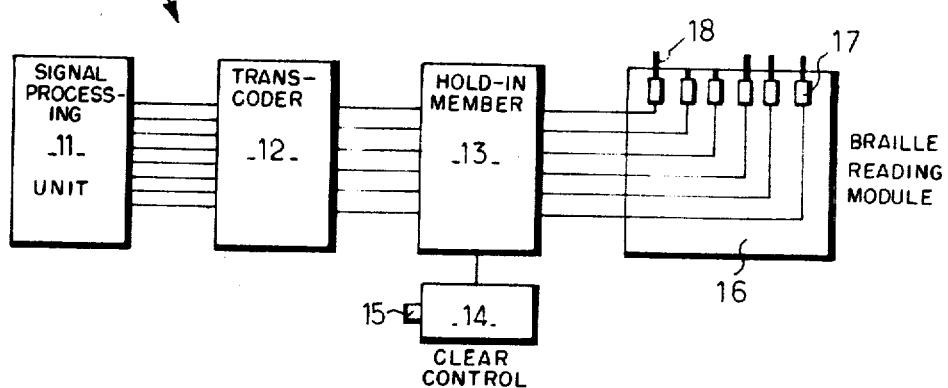
FIG. 1 is a block diagram of a known arrangement for converting digital electrical signals representing characters into a representation of these characters in Braille code.

FIG. 1 illustrates a known conversion arrangement 10. This arrangement comprises a signal processing unit 11 which supplies at its output binary signals, such as octal coded signals, representative of selected characters. A transcoder 12 converts the octal coded signals into signals coded on six bits. A hold-in member 13 receives the output signals from the transcoder 12 and is associated with a clearing member 14 provided with a clearing button 15. Reproducing block 16 represents schematically a Braille module having six windings 17 each provided with a plunger core 18 responsive to energization of a selected winding by the output of hold-in member 13.

One of the chief disadvantages of the aforedescribed conversion arrangement arises from the necessary presence of hold-in member 13. Another drawback of the arrangement lies in the fact that the plunger cores 18 which project from the reading surface of the Braille module are not locked mechanically, since they project only as a result of the energization of the coils 17. Also, when a blind person passes his or her hands across the reading surface of the module, it may happen that certain plunger cores 18 retract slightly under the pressure from his or her fingers, thus giving the reader wrong information.

Figure 2:
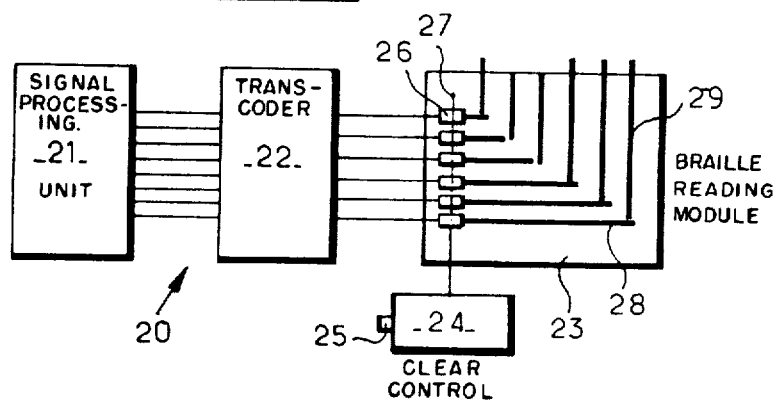
FIG. 2 shows a conversion arrangement according to the invention in block diagram form.

FIG. 2 illustrates a conversion arrangement 20 according to the invention. As in the prior art arrangement 10, the arrangement 20 includes a conventional processing unit 21 which produces at its output digital electrical signals representative of characters. The signals may be arranged in octal code, for example. A transcoder 22 converts the signals into a six-bit format and applies the signals to a Braille reproducing block 23. Block 23 may contain a plurality of Braille modules; however, only one module is shown schematically in FIG. 2. A clearing member 24 provided with a clearing button 25 provides a clearing signal or function for the module. By virtue of the novel structure of the Braille reading module or reproducing block 23, the six windings 26 are directly connected to respective ones of the six outputs of the transcoder 22, while at the same time, being associated with the output of the clearing member 24 as indicated by the broken line 27. The displays are automatically maintained in the read condition by means of the special arrangement of the plunger cores 28 which correspond to respective ones of the windings 26, and which cooperate with the reproducing stems 29 in the manner which will now be described with reference to FIGS. 3 to 5.

As viewed in the drawings, FIGS. 3 and 4 are views, looking along arrows III and IV, respectively, of a Braille reproducing module 30 constructed in accordance with the present invention and housed within reproducing block or Braille display panel 23. FIG. 5 is a cross-sectional view of such a module on line V—V of FIGS. 3 and 4.

Module 30 includes the chief components indicated in the reproducing block 23 in FIG. 2, i.e. the six windings 26 (26a to 26f), the six corresponding plunger cores 28 (28a to 28f), and the six stems 29 (29a to 29f), each of which cooperate with a respective one of the six plunger cores 28. Each module 30 is formed by a body 31 which has, on an upper surface 32, which forms the reading surface of the module 30, a grid of six dots 33 (33a to 33f) formed by the upper ends of the stems 29. The stems are shown in greater detail in FIG. 5. From the configuration of the dots 33 which project above the surface 30 in a grid pattern so as to extend above the plane of this surface, a blind person senses a character represented in the Braille code, which may be a letter, figure, a punctuation mark, a mathematical symbol or a symbol in musical notation.

FIGS. 3 to 5 clearly show the location of windings 26a to 26f on the body 31 of each module 30 and the relationship between their plunger cores 28a to 28f and the corresponding stems 29. It can thus be seen that three windings 26 are positioned and secured conveniently on either side of the body 31 or the module 30.

The basic feature of the invention relates to the automatic locking of the stems 29 and is perhaps best illustrated in FIG. 5. As shown therein, each stem 29 is mounted to slide in a well 34 which opens substantially orthogonally into an associated cavity 35 in which one of the plunger cores 28 is able to side when acted on by an associated winding 26.

The reading surface 32 of the module 30 is formed, in the embodiment illustrated, by a plate 36 which covers the body 31, while being separated from it by a spacer ring 37 so as to leave a gap 38. When the stems 29 are in the position where they do not project from the reading surface 32, the stems 29, at their lower ends, project into the slide cavities 35. The stems are supported in this position by a stop member 39 which takes the form of a collar in the embodiment illustrated. The collar member 39 rests on the upper face of the body 31 and the gap 38 to prevent the stem from retracting to an extent where the lower end as seen in the drawing would block the slide cavity.

In the illustrated embodiment, plunger cores 28 are made up of two end parts 28' and 28''. The first ends 28' are contained within the windings 26 and are formed from a soft magnetic material such as, for example, soft iron, so as to be capable of reacting to the passage of a current flowing through the windings. The second ends 28' are made of a non-magnetic material and are adapted to cooperate with the lower ends of the stems 29. So as to allow each second end 28'' to insert itself under the stems 29, these ends have a bevelled engagement face 40 which is frusto-conical face in the embodiment illustrated. Also, it should be noted that stems 29 in the retracted position extend so as to be engaged by the core, but do not extend so far into the cavity as to block the cavity and prevent the bevelled surface from raising the stem.

Each winding 26 may be energized in response to electrical signals coming from transcoder 22 to generate a magnetic write flux which is able to cause the associated plunger core 28 to be propelled into the corresponding cavity 35 wherein it cooperates with the corresponding stem 29. A magnetic clearing flux which is designed to move the plunger core 28 in the opposite direction so as to retract it from the associated cavity and disengage it from the corresponding stem may be generated in response to a clearing signal emitted by the clearing member 24 shown in FIG. 2 upon depression of button 25.

In the embodiment illustrated, in view of the structure of the plunger cores 28, the two fluxes are generated respectively by axially disposed coils 41, 42 which together form each winding 26. Thus, coils 41 and 42 form the writing and clearing coils respectively. These coils lie in line, coaxially with the corresponding plunger core. The coils 41 (41a to 41f) are each fed by two wires 43 (43a to 43f) which form one of the six output channels of the transcoder 22 (FIG. 2). The coils 42 are each fed by two wires 44 (44a to 44f) which forms the connection 27 shown as a broken line in FIG. 2 which represents the connection for ordering a clearing function to take place. Finally, abutment plugs 45 are fitted to the outermost ends of the coils 42 to act as stops for the first ends 28' of the plunger cores 28.

Operation of a module 30 according to the invention is as follows:

In the rest state, the plunger cores 28 are retracted into the windings 26 in the manner shown by the plunger cores 28a and 28b situated on the left in FIG. 5. These plunger cores thus have their first ends 28' positioned against the abutment plugs 45 at the outermost ends of coils 42. Assuming that the signal which passes along the wires 43c to feed or energize the write coil 41 of winding 26c, and which comes from one of the six outputs of the transcoder 22, goes to a given writing level (the logic "1" level), the plunger core 28c will be caused to enter the corresponding cavity 35 in the body 31 of the module 30. Its conical part 40 will engage under the lower end of the corresponding stem 33c and cause the stem to raise as it continues to move to the end of the cavity, the end wall of which forms an abutment or stop for the stem. The raised stem rests on top of the inserted plunger core 28. In this way, the upper end 33c of stem 29c projects above the surface 32 and automatically remains in the projecting position by virtue of the locking function which the plunger core 28c performs by preventing the 29c from dropping back. It should be apparent that this locking arrangement provides a secure and effective latch since the conical portion 40 of the plunger core is inserted beyond the stem well and is clear of that area to ensure that the stem rests on the surface of the corresponding plunger core in the writing position. The surface area of the plunger core with which the stem is in contact will be at a maximum and since it is unyieldable prevents the stem from being pushed in when read. It should also be apparent that the locking function exists whether or not current is present in the write coils 41, since a clear signal is necessary to withdraw the plunger from a cavity. Consequently, the write signal from the transcoder 22 may be a transient one. When the blind person wishes to erase the character reproduced by the module 30, button 25 of the clearing member 24 shown in FIG. 2, must be pressed. This action causes a current to flow via wires 44, to the clearing coils 22. The clearing flux generated by these coils causes the plunger coils 28 which are cooperating with the stems 29 to retract and as a result the stems drop back under their own weight and return to the rest position in which they do not project above the reading surface 32.

Numerous modifications may be made to the embodiment which has just been described. For example, plunger cores 28 may have a first end part 28' made of a magnetic material of the permanently magnetized, longitudinally polarized type such that a single coil can be used for both writing and clearing. The clearing signal applied to the coil in this case is a DC current in the opposite direction from the writing current. In the embodiment illustrated the writing and clearing current may be either DC or AC.

Furthermore, whereas in the embodiment illustrated in FIGS. 1-5, the force which returns the stems to the retracted position in which they do not project from the reading surface 32 is the force of gravity, the return force could be generated by resilient means such as a spring 50 shown in FIG. 6 held between the stop collar 39 and the lower face of the plate 36.

Moreover, the manner of causing the stems to project and of locking them may be varied from that illustrated in FIG. 5 without departing from the spirit of the invention.

Also, a module 30 made in accordance with the invention need not be restricted to reproducing Braille characters. As an example, the stems 33 could be used to control any kind of operating member, for example, by closing or opening the electrical contacts 51, 52 of a switch connected by wires 53, 54 to a suitable circuit. This would have the advantage that the switch or circuit could be activated in response to a transient energizing signal and held on in the absence of the energizing signal until a clearing signal is applied. The stems could likewise act on members which exerted control functions in fluidics technology.

Although the invention has been described and illustrated with respect to a specific embodiment, it will be appreciated by those skilled in the art that various modifications thereto may be made without departing from the true spirit and full scope of the invention as defined by the appended claims.

I claim:

1. Apparatus for converting digital electrical signals representing characters into a particular pattern of dots symbolizing each of the said characters which pattern of dots project from a given surface of a module and which pattern of dots are selected from a given number of dots in a predetermined grid, comprising at least one group of stems having first ends arranged to form the said given number of dots in a predetermined grid, a plurality of coil means supported to said module and responsive to the said electrical signals to cause said stems to project, selectively from the said given surface, said module having a plurality of wells and a plurality of cavities, each of the said stems being mounted to slide in an associated well which opens substantially orthogonally into an associated cavity, a plurality of plunger cores each being disposed to slide in an associated cavity, each plunger core having a first end adapted to be subjected to a magnetic write flux which propels the said plunger core in a given direction and to a magnetic clearing flux which moves said plunger core in the opposite direction, said fluxes being generated respectively by at least one of the said coils in response to the said electrical signals and a clearing signal respectively, and each plunger core having a second end cooperating with the second end of the associated stem to cause the stem to be raised so that its first end projects above the given surface of the module in response to the said magnetic write flux, and to maintain said first end projecting until the said first end of said plunger core is subjected to a clearing flux.

2. Apparatus as set forth in claim 1 wherein each coil means comprises two coils co-axially disposed with a cooperating plunger and disposed respectively for subjecting said cooperating plunger to the magnetic write and clearing flux.

3. Apparatus according to claim 1 or 2 wherein the said first ends of said plunger cores are made from a magnetic material and the second ends are made from a non-magnetic material.

4. Apparatus according to claim 3 wherein the magnetic material of the said first ends is of the permanently magnetized, longitudinally polarized type.

5. Apparatus according to claim 1 wherein each plunger core is associated with a signal coil arranged to generate the said magnetic write flux in response to a DC current which flows through the said coil in a given direction and which originates from the said electrical signals, and which generates the said magnetic clearing flux in response to a DC current which flows through the said coil in the opposite direction and which originates from the said clearing signal.

6. Apparatus according to claim 4 or 5 wherein the said second ends of the plunger cores have a bevelled engagement face.

7. Apparatus according to claims 1 or 5 wherein the force for returning the stems to the position in which they do not project above the given surface of the module is the force of gravity.

8. Apparatus according to claims 1 or 5 wherein the force for returning the stems to the position in which they do not project above the given surface of the module is generated by resilient means.

9. Apparatus according to claims 1 or 5 wherein the stems include stop means at their first ends which rest against edges of the said wells to limit travel of the stems.

10. Apparatus according to claims 1 or 5 including transcoding means for supplying from its output the said digital electrical signals converted into a code corresponding to the said number of dots in the said grid in response to digital signals expressed in a different code.

11. Apparatus according to claims 1 or 5 wherein the grid comprises six dots for Braille script.

12. Apparatus according to claims 1 or 5 including operating means disposed to be controlled in response to the position of said stems.

* * * * *